(12) United States Patent
Zysman

(10) Patent No.: US 7,455,498 B2
(45) Date of Patent: Nov. 25, 2008

(54) SLOTTED BLEED DEFLECTOR FOR A GAS TURBINE ENGINE

(75) Inventor: Steven H. Zysman, Amston, CT (US)

(73) Assignee: United Technologies Corporation, Hartford, CT (US)

(*) Notice: Subject to any disclaimer, the term of this patent is extended or adjusted under 35 U.S.C. 154(b) by 361 days.

(21) Appl. No.: 11/471,114

(22) Filed: Jun. 19, 2006

(65) Prior Publication Data

US 2007/0289309 A1 Dec. 20, 2007

(51) Int. Cl.
*F01D 9/00* (2006.01)

(52) U.S. Cl. .............. 415/144; 415/208.2; 415/191; 415/211.2

(58) Field of Classification Search .......... 415/144, 415/208.2, 211.2, 191; 60/785
See application file for complete search history.

(56) References Cited

U.S. PATENT DOCUMENTS

| 4,537,277 | A | * | 8/1985 | Bryce | 181/214 |
| 4,546,605 | A | * | 10/1985 | Mortimer et al. | 60/226.1 |
| 6,565,313 | B2 | | 5/2003 | Nikkanen et al. | |
| 6,588,195 | B2 | * | 7/2003 | Negulescu | 60/785 |

* cited by examiner

*Primary Examiner*—Ninh H Nguyen
(74) *Attorney, Agent, or Firm*—Bachman & LaPointe, P.C.

(57) ABSTRACT

The invention relates to a slotted bleed deflector for a gas turbine engine. The bleed deflector comprises an inlet portion for receiving bleed air from the engine and a body for distributing the bleed air into a fan bypass duct. The body includes a leading edge section, a trailing edge section and a flow compartment section where the flow compartment distributes the bleed air above an inner wall of the bypass duct.

20 Claims, 5 Drawing Sheets

SLOTTED BLEED DEFLECTOR FOR A GAS TURBINE ENGINE

BACKGROUND OF THE INVENTION

The invention relates generally to the field of gas turbine engines. More specifically, the invention relates to an efficient slotted bleed deflector.

Current high pressure compressor bleed discharge designs consist of either a tube or a vaned deflector which directs high temperature engine bleed air into a fan duct. These arrangements often lead to structural problems caused by the bleed air plume impacting the inner and outer fan duct walls, exceeding their temperature limits. Bleed discharge air is typically in the range of from 800° F. to 1000° F., while fan air is nominally 240° F. Duct material temperature limits are on the order of 300° F. to 350° F.

It has been found that devices which use flush outlets cause inner duct wall burns because cooler fan air cannot get immediately downstream of the outlet to dilute the hot discharge flow from the device.

Attempts have been made to develop a bleed deflector which avoids the problem of inner duct wall burns. There remains a need for a bleed deflector which adequately discharges the bleed air from a compressor of a gas turbine engine.

SUMMARY OF THE INVENTION

Although there are various types of bleed air deflectors, such deflectors are not completely satisfactory for gas turbine engines. The inventor has discovered that it would be desirable to have an efficient bleed deflector that distributes high temperature bleed air into a cooler bypass air stream sufficiently that no adverse affects to the inner or outer duct walls are experienced.

One aspect of the invention provides a slotted bleed deflector for a gas turbine engine. Deflectors according to this aspect of the invention comprise an inlet portion for receiving bleed air from the engine and a body for distributing the bleed air into a bypass duct, the body comprising a leading edge section, a trailing edge section, and a flow compartment section wherein the flow compartment distributes the bleed air above an inner wall of the bypass duct.

Another aspect of the invention is a method of sizing a slotted bleed deflector for a gas turbine engine having a maximum bleed air flow rate and bypass duct air stream velocity profile. Methods according to this aspect begin with determining bypass duct size constraints, determining a deflector height h from the bypass duct size constraints, determining how many deflectors are required from the maximum bleed air flow rate and the bypass duct size constraints, determining total slot area per deflector from the maximum bleed air flow rate, deriving a flow compartment cross sectional area based on twice the total deflector slot area, deriving a deflector width w from the flow compartment cross sectional area, and deriving a deflector length l from the deflector width w.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
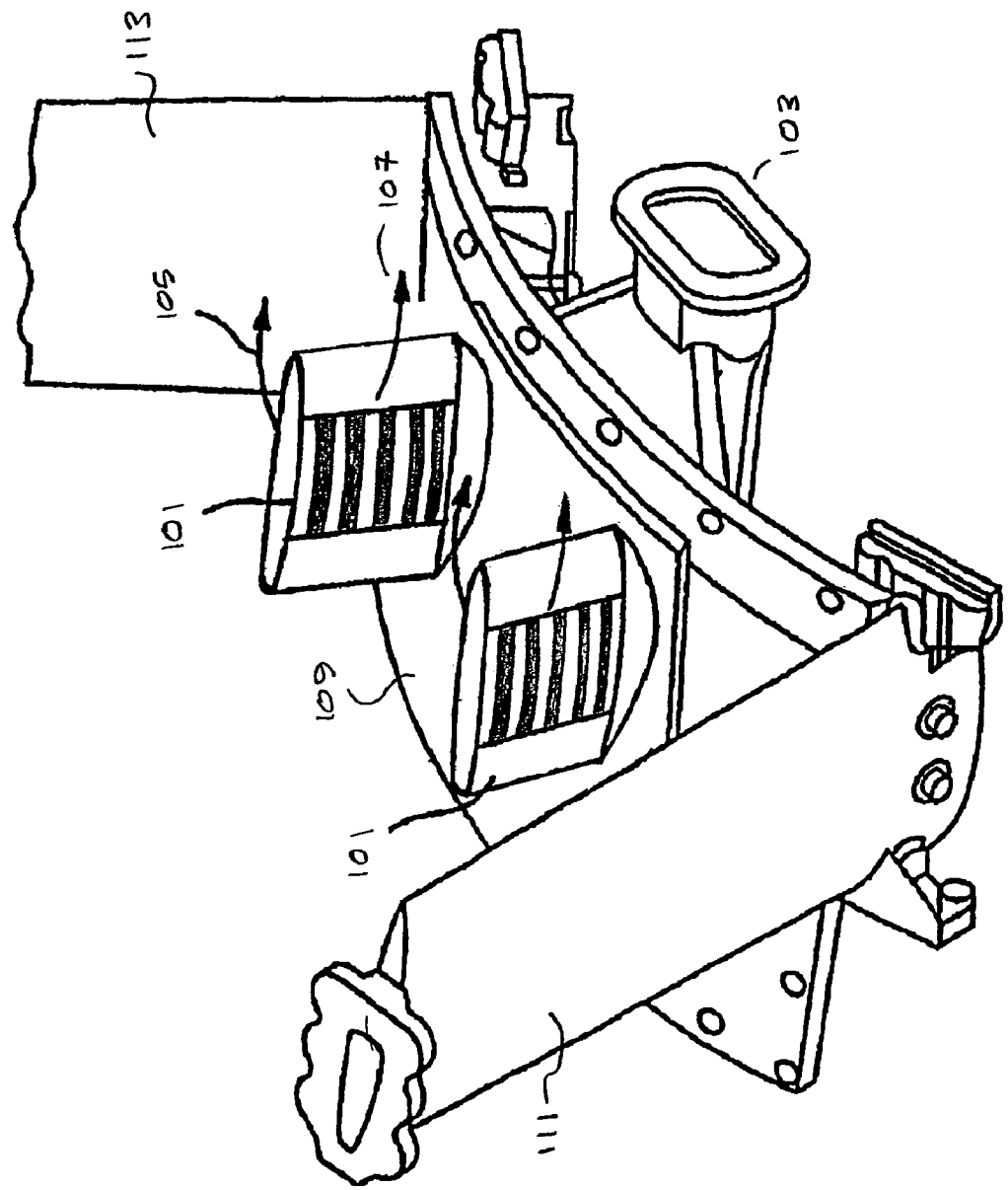
FIG. 1 is a perspective view of two bleed deflectors in accordance with the invention coupled to a common bleed air plenum and mounted in an inner duct surface.
Figure 2:
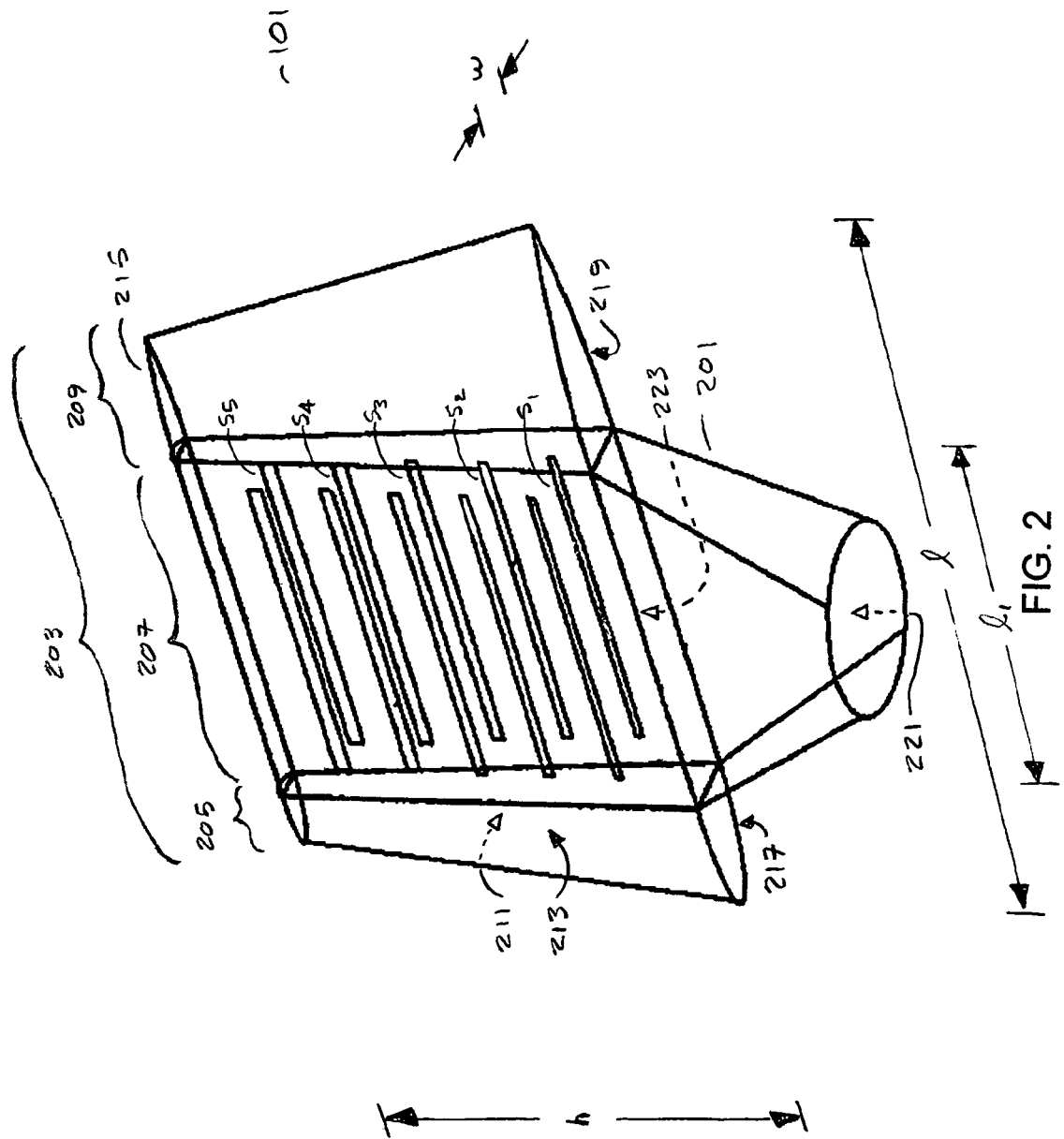
FIG. 2 is a see-through, perspective view of an exemplary bleed deflector in accordance with the invention.
Figure 3:
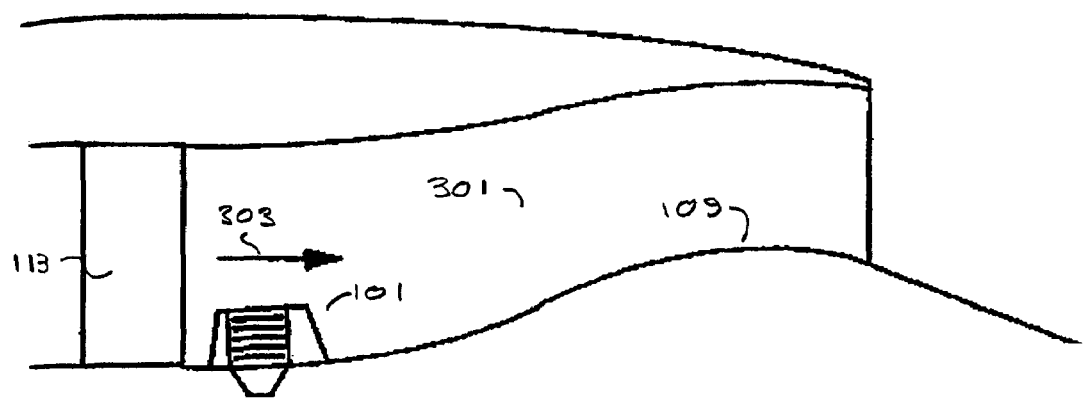
FIG. 3 is a fan duct side view showing the bleed deflector positioned.
Figure 4:
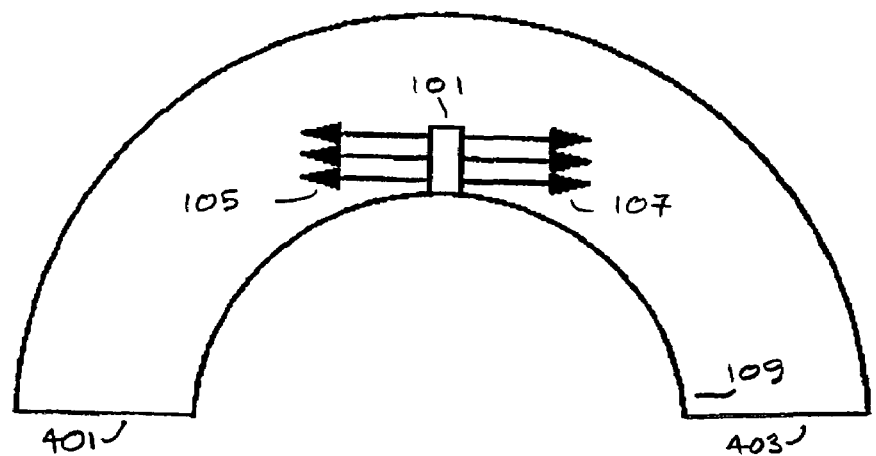
FIG. 4 is a fan duct cross section showing-the bleed deflector of the invention.

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

Referring to FIGS. 1-4, a slotted bleed deflector 101 according to the invention is shown. The slotted bleed deflector 101 has an inlet portion 201 for receiving bleed air from a compressor stage bleed plenum 103 of a gas turbine engine. The slotted bleed deflector 101 further has a body 203 for distributing bleed air 105, 107 in controlled streams positioned above an inner wall 109 of a fan duct 301.

The body 203 is aerodynamically shaped to minimize drag and to allow for an unimpeded amount of dilution air generated by the bypass engine fan (not shown) over three exposed surfaces. This eliminates contact of the hot bleed gasses 105, 107 with the duct inner wall 109 during low and high power operation of the engine, or should a bleed valve (not shown) leak.

The body 203 comprises three sections; a leading edge section 205, a trailing edge section 209, and a flow compartment section 207 for distributing hot bleed air. In a preferred embodiment, the flow compartment 207 has arctuately shaped, non-linear side surfaces 211, 213 extending between the leading edge 205 and trailing edge 209 sections. In other variants, the flow compartment 207 may have linear side surfaces extending between the leading edge 205 and trailing edge 209 sections. The flow compartment 207 may be completely hollow, may be hollow with internal bracing spanning between both side 211, 213 inner surfaces, or may have internal channels running the flow compartment 207 height.

The flow compartment 207 is coupled to the inlet 201 to allow bleed flow to pass through the plenum 103 and through the inlet 201 to the flow compartment 207. The inlet 201 is sized such that if the inlet entrance 221 is substantially round, that area is approximately equal to the inlet 201 exit area 223 which is substantially a quadrangle. The inlet 201 does not act as a restriction. The leading edge 205 and trailing edge 209 body sections include base surfaces 217, 219 integrally formed with or joined to the body 203. A top surface 215 covers the leading edge 205, flow compartment 207 and trailing edge 209 sections. Preferably, the deflector 101 may be fabricated from high grade stainless steel. Other materials that meet the bleed air temperature requirements may also be used.

The body 203 has a height h, a length l, a flow compartment 207 length $l_1$, a width w and a number n of slots $s_1, s_2, s_3, s_4, s_5, \ldots s_N$ located on each side of the flow compartment 207 to distribute and exhaust the high temperature engine bleed air 105, 107. The area $s_{n\_area}$ of each slot $S_n$ is predefined to insure that the bleed air does not contact the inner duct wall 109.

In a preferred embodiment, the bleed deflector 101 contains 10 slots, with n=5. Five slots are located on each side of the flow compartment 207. Other deflector variants may use any number of slots on either side, including uneven numbers of slots on either side. If the bleed deflector 101 is located near an endwall 401, 403, one side of the deflector may have fewer slots than the other side, or no slots to minimize overheating the surface of the endwall 401, 403.

The total slot area $s_{total\_area}$ is based on the maximum bleed flow requirement for that deflector. The bleed flow requirement is an engine parameter and the number of deflectors 101 used for an engine application considers the maximum bleed flow $f_{bleed\_max}$ and available bypass duct space. The length of a slot $s_n$ may run the length $l_1$ of the flow compartment 207 (sidewall) or in some cases may run less than the length $l_1$ of the flow compartment 207. The flow compartment 207 regions between slots $s_n$ allow fan air to flow smoothly over the sides of the trailing edge section 209 of the deflector 101 without disruption. Bleed air exhausted 105, 107 from the deflector 101 flows over the trailing edge section 209 without contact.

Figure 5:
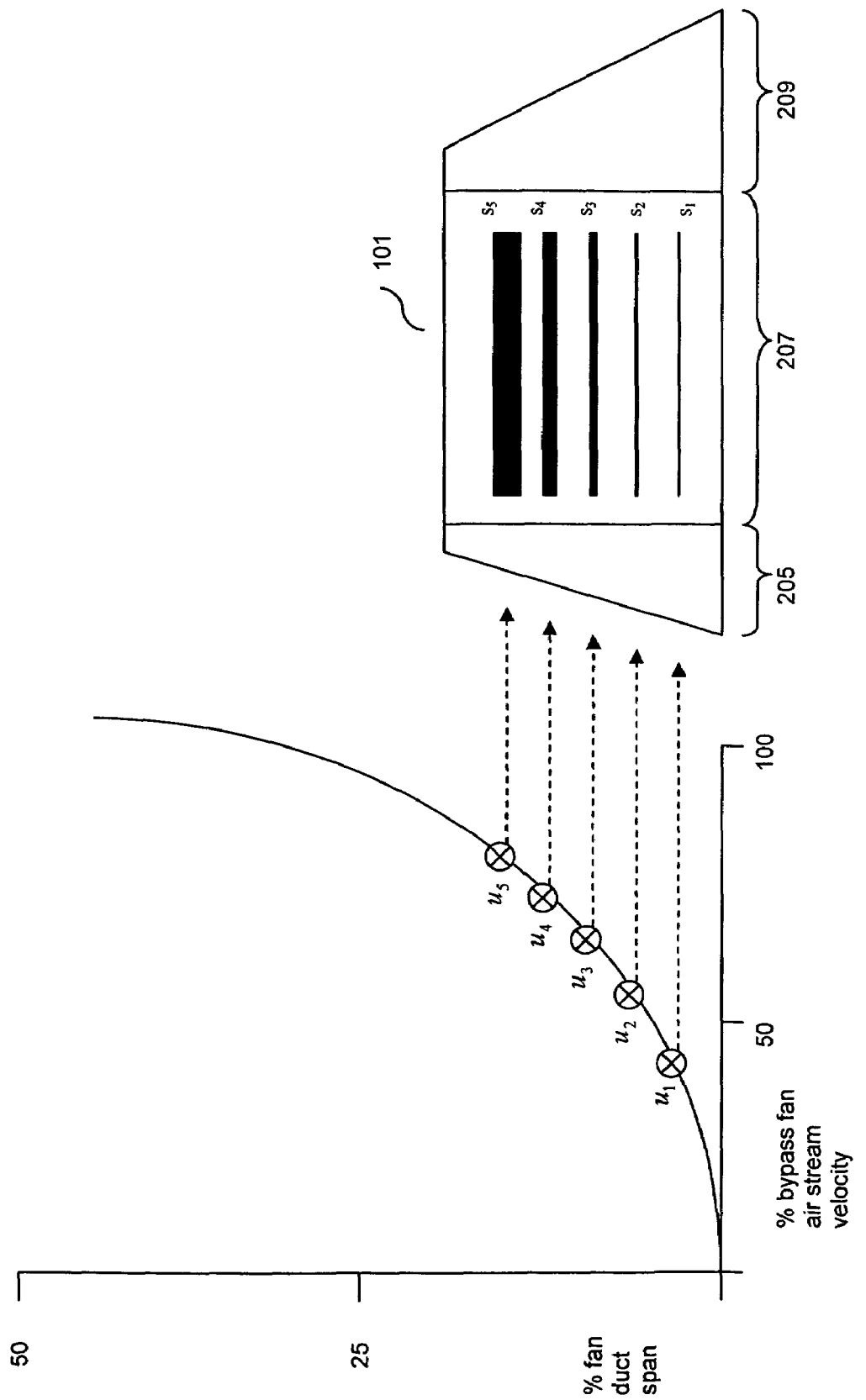
FIG. 5 is a plot showing bypass fan duct position, corresponding bypass fan air velocity, and deflector slot area determination.

The height h of each deflector 101 is proportional to the velocity of the local fan stream. In most gas turbines, the fan discharge velocity profile increases rapidly near the inner duct wall 109 as shown in FIG. 5.

The slot sizing maximizes mixing of the hot bleed air with the cold fan air stream 303 by placing a slot with the smallest opening (most restrictive) where the fan stream velocity is lowest. The lowest velocity is typically found near the inner duct wall 109 where the bypass fan provides the least flow. This prevents a large amount of hot bleed air from impacting, through mixing, the inner duct wall 109 composite material. Typical nacelle inner fixed structures, including the inner duct wall 109 and support struts 111, 113 may only be heated to 300° F. before losing structural integrity. Bleed air can be in excess of 1000° F. The slotted bleed deflector 101 has particular utility with composite nacelles since composites burn more easily than metallic nacelles.

Figure 6:
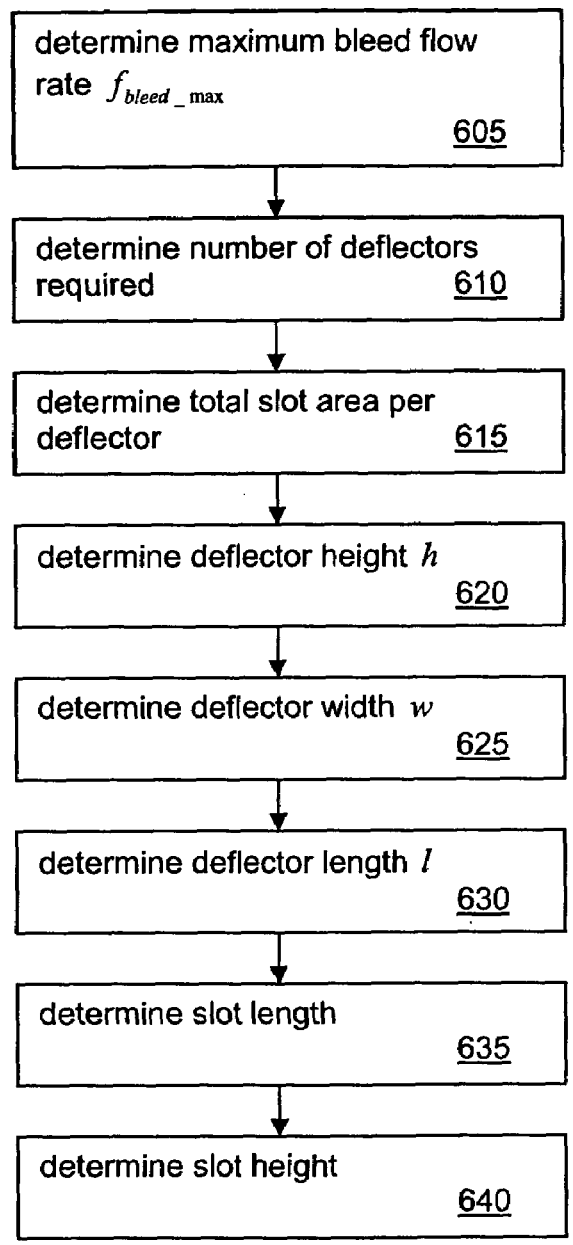
FIG. 6 is a block diagram of an exemplary method according to the invention.

The method of the invention is shown in FIG. 6. To configure a deflector 101 for a given gas turbine engine application, the maximum bleed air flow rate $f_{bleed\_max}$ based on engine operating parameters is determined (step 605). From the maximum bleed air flow rate and the bypass duct physical size constraints, a number of deflectors are determined (step 610). Typically, one or two deflectors 101 may be sufficient. If the deflectors are too large after using the method of the invention, the quantity may be increased.

The high temperature engine bleed air will be choked at the deflector 101 bleed slots $s_n$. Slot area controls distributing bleed flow (step 615). Based upon the maximum bleed flow rate $f_{bleed\_max}$ divided by the number of deflectors desired, flow rate per deflector 101 is determined and the flow that must be distributed through the slots $s_n$, is known. As discussed above, the height h of a deflector is determined by the bypass duct size and bypass fan flow velocity. Deflector height h is in the range of from about 20-30% of fan duct height at a deflector location. Deflector 101 height h is preferably 25% (step 620).

To keep internal flow losses (restrictions) as low as possible, the deflector 101 width w must allow for a flow compartment 207 cross sectional area ($l_1 \times w$) that is approximately twice the total slot area $s_{total\_area}$, $$2s_{total\_area} \approx (l_1 \times w), \quad (1)$$

where, $$s_{total\_area} \approx 2(s_{1\_area} + s_{2\_area} + s_{3\_area} + s_{4\_area} + s_{5\_area}). \quad (2)$$

This relationship keeps internal flow losses to a minimum (step 625).

The maximum thickness to $$\text{chord ratio } \frac{t}{c}$$

may be preferably 15%. Once the width w is known (thickness), the length l (chord) may be derived. The length l includes the leading edge 205, flow compartment 207 and trailing edge 209 sections (step 630).

Slot length is approximately the same length $l_1$ as the flow compartment 207. The preferred embodiment of the deflector 101 contains five slots per flow compartment 207 side 211, 213 (step 635). The slots may be equally spaced, or in a variant, slot spacing may be in matching correspondence with any bypass fan flow velocity profile point $u_n$. Slot height is proportional c to the bypass fan axial velocity at that point $u_n$, $$s_{1\_height} = cu_1, \quad (3)$$

$$s_{2\_height} = cu_2, \quad (4)$$

$$s_{3\_height} = cu_3, \quad (5)$$

$$s_{4\_height} = cu_4, \text{ and} \quad (6)$$

$$s_{5\_height} = cu_5. \quad (7)$$

$$s_{total\_area} = 2\sum_{n=1}^{N} cu_n \quad (8)$$

where $u_n$ are fan flow velocities at a given elevation above the inner duct wall 109. Solving for c, $$c = \frac{s_{total\_area}}{2\sum_{n=1}^{N} u_n}. \quad (9)$$

The proportionality constant •c ensures that the total slot area $s_{total\_area}$ meets the above flow rate requirements. This results in an increasing slot height with elevation from the inner duct wall 109 (step 640).

One or more embodiments of the present invention have been described. Nevertheless, it will be understood that various modifications may be made without departing from the spirit and scope of the invention. Accordingly, other embodiments are within the scope of the following claims.

What is claimed is:

1. A bleed deflector for a gas turbine engine comprising:
   an inlet portion for receiving bleed air from the engine; and
   a body for distributing the bleed air into a bypass duct, said body comprising:
   a leading edge section;
   a trailing edge section; and a flow compartment section wherein said flow compartment distributes said bleed air above an inner wall of said bypass duct and comprises means for controlling the distribution of said bleed air into at least one stream elevated from said bypass duct inner wall.

2. The bleed deflector according to claim 1 wherein said body is a shaped strut that provides bypass duct dilution air flow over three exposed surfaces.

3. The bleed deflector according to claim 1 wherein said means for controlling bleed air distribution comprises at least one rectangular opening located on a side of said flow compartment.

4. The bleed deflector of claim 1 wherein the means comprises:
on both of first and second sides of the flow compartment a plurality of rectangular openings.

5. The deflector of claim 1 wherein the means comprises:
on both of first and second sides of the flow compartment, a first opening and a second opening, the first opening closer to the inner wail than the second opening and smaller than the second opening.

6. The deflector of claim 1 wherein the means comprises, on at least one of two sides of the flow compartment, a plurality of slots spaced one above another relative to the inner wall.

7. The deflector of claim 6 wherein the slots are oriented to extend end-to-end between the leading section and the trailing section.

8. A method of sizing a slotted bleed deflector for a gas turbine engine having a maximum bleed air flow rate and bypass duct air stream velocity profile comprising:
determining bypass duct size constraints;
determining a deflector height h from said bypass duct size constraints;
determining how many deflectors are required from the maximum bleed air flow rate and said bypass duct size constraints;
determining total slot area per deflector from the maximum bleed air flow rate;
deriving a flow compartment cross sectional area based on twice said total deflector slot area;
deriving a deflector width w from said flow compartment cross sectional area; and
deriving a deflector length l from said deflector width w.

9. The method according to claim 8 further comprising determining a slot length from said flow compartment length.

10. The method according to claim 9 further comprising determining a number of slots from said total slot area.

11. The method according to claim 10 further comprising determining a slot height from said bypass duct air stream velocity profile.

12. The method according to claim 11 wherein said slot height is proportional to said bypass duct air stream velocity at an elevation from a wall of said bypass duct.

13. The method according to claim 12 further comprising deriving a proportionality constant from said total slot area and said bypass duct air stream velocity at an elevation from a wall of said bypass duct.

14. The method according to claim 8 further comprising determining a number of slots from said total slot area.

15. The method according to claim 8 further comprising determining a slot height from said bypass duct air stream velocity profile.

16. The method according to claim 15 wherein said slot height is proportional to said bypass duct air stream velocity at an elevation from a wall of said bypass duct.

17. The method according to claim 8 further comprising deriving a proportionality constant from said total slot area and said bypass duct air stream velocity at an elevation from a wall of said bypass duct.

18. A slotted bleed deflector for a gas turbine engine comprising:
an inlet portion for receiving bleed air from the engine; and
a body for distributing the bleed air into a bypass duct, said body comprising:
a leading edge section;
a Wailing edge section; and
a flow compartment section wherein said flow compartment distributes said bleed air above an inner wall of said bypass duct, wherein:
said body is a shaped strut that provides bypass duct dilution air flow over three exposed surfaces;
said flow compartment further comprises means for controlling the distribution of said bleed air into at least one stream elevated from said bypass duct inner wall;
said means for controlling bleed air distribution comprises at least one rectangular opening located on a side of said flow compartment; and
said at least one rectangular opening has an area sized according to a bypass air stream flow velocity located on said body at an elevation from said inner duct wall where said at least one rectangular opening is located.

19. A bleed deflector for a gas turbine engine comprising:
an inlet portion for receiving bleed air from the engine; and
a body for distributing the bleed air into a bypass duct, said body comprising:
a leading edge section;
a Wailing edge section; and
a flow compartment section having:
a first side having a plurality of openings; and
a second side having a plurality of openings, the openings of the first side and the second side sized to progressively distribute more of the bleed air from an inner wall end of the flow compartment outward.

20. The deflector of claim 19 wherein:
each of the first and second sides has:
a first said opening; and
a second said opening, the first said opening being smaller than the second said opening and closer to the inner wall.

* * * * *

UNITED STATES PATENT AND TRADEMARK OFFICE
CERTIFICATE OF CORRECTION

| | | |
|---|---|---|
| PATENT NO. | : 7,455,498 B2 | Page 1 of 1 |
| APPLICATION NO. | : 11/471114 | |
| DATED | : November 25, 2008 | |
| INVENTOR(S) | : Steven H. Zysman | |

It is certified that error appears in the above-identified patent and that said Letters Patent is hereby corrected as shown below:

In column 5, claim 5, line 21, delete "wail" and insert --wall--.

In column 6, claim 18, line 23, delete "Wailing" and insert --trailing--.

In column 6, claim 19, line 44, delete "Wailing" and insert --trailing--.

Signed and Sealed this

Seventeenth Day of November, 2009

David J. Kappos
*Director of the United States Patent and Trademark Office*